United States Patent [19]

Foerster et al.

[11] Patent Number: 4,639,776

[45] Date of Patent: Jan. 27, 1987

[54] INDICATING DEVICE FOR A PRINTING MACHINE FOR SUPERIMPOSING INK KEY SETTING VALUES ON AN IMAGE TO BE PRINTED

[75] Inventors: Karl-Heinz Foerster, Dresden; Siegfried Koerner, Coswig, both of German Democratic Rep.

[73] Assignee: Veb Kombinat Polygraph "Werner Lamberz" Leipzig, Leipzig, German Democratic Rep.

[21] Appl. No.: 545,740

[22] Filed: Oct. 26, 1983

[30] Foreign Application Priority Data

Oct. 26, 1982 [DD] German Democratic Rep. .... 244262

[51] Int. Cl.[4] .......................... H04N 7/18; B41F 31/02

[52] U.S. Cl. ....................................... 358/107; 358/93; 101/365

[58] Field of Search ................ 340/721, 734; 101/335, 101/364, 365, DIG. 24, DIG. 26, 350; 358/75, 93, 107

[56] References Cited

U.S. PATENT DOCUMENTS

| | | | |
|---|---|---|---|
| 3,848,082 | 11/1974 | Summers | 340/721 |
| 3,930,447 | 1/1976 | Murray | 101/365 |
| 3,958,509 | 5/1976 | Murray et al. | 358/107 |
| 4,008,664 | 2/1977 | Crum et al. | 101/365 |

FOREIGN PATENT DOCUMENTS

| | | | |
|---|---|---|---|
| 2727426 | 12/1978 | Fed. Rep. of Germany . | |
| 2121357 | 12/1983 | United Kingdom | 101/365 |

*Primary Examiner*—James J. Groody
*Assistant Examiner*—Randall S. Svihla
*Attorney, Agent, or Firm*—Michael J. Striker

[57] ABSTRACT

An indicating device for a printing machine includes a scanner for producing signals corresponding to an input print image to be printed. Desired or actual setting values for ink keys are converted into digital signals and are mixed with the signals from the scanner. The mixed signals are simultaneously transmitted to a display device which displays the setting values superimposed over the input print image to be printed.

7 Claims, 2 Drawing Figures

INDICATING DEVICE FOR A PRINTING MACHINE FOR SUPERIMPOSING INK KEY SETTING VALUES ON AN IMAGE TO BE PRINTED

BACKGROUND OF THE INVENTION

The invention relates to an indicating apparatus for ink control units of printing machines.

From the U.S. Pat. No. 3,930,447, an indicating apparatus for ink control units is known having a picture screen for displaying the values to be indicated, for example density values, setting values, and position values, tolerance values, nominal values, and actual values.

The association of these values to an input print image is obtained by displaying the numbers of the corresponding ink zone screws or ink keys at the upper edge of the picture screen.

Another indicating apparatus for ink control units is known from the West German Auslegeschrift No. 27 27426 B2 in which the association of the values to the print image is obtained by special association of one or several indicators below and/or above a printed sheet located on a measuring table.

Both indicating apparatuses have the disadvantage that the association of the values to the input print image necessitates a separate detecting of the indicated values on the one hand and of the input print image on the other hand, and requires a subsequent mental association on the part of an operator. Such association between the indicated value and the input print image is inaccurate and can lead to faulty operations. Moreover, the known indicating apparatuses are rather inconvenient to handle and require considerable space.

SUMMARY OF THE INVENTION

In general, it is an object of the present invention to avoid the prior art disadvantages.

In particular, it is an object of the present invention to provide an indicating apparatus for ink control units which enables an unambiguous association of the input print image and the indicated value.

Still another object of the present invention is to provide an indicating apparatus which is convenient to handle and requires less space.

In keeping with these objects and others which will become apparent hereinafter, one feature of the present invention resides in an indicating apparatus for ink control units of printing machine which comprises means for displaying an image, means for providing signals in correspondence to administered desired values or sensed actual values of the ink control units, means for scanning an input print image and providing corresponding signals, means for receiving and mixing the corresponding signals, means for simultaneous transmission of the mixed signals to the displaying means and simultaneous display thereof. The providing means is a character generator which has an output connected to the input of the receiving and mixing means.

According to another feature of the present invention, the indicating apparatus comprises a control unit which is interposed between the scanning means and the mixing means and includes either an image converter and an ink selector switch coupled therewith or in addition to the image converter and the ink selector switch an image memory.

The scanning means is preferably a television camera or a scanner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
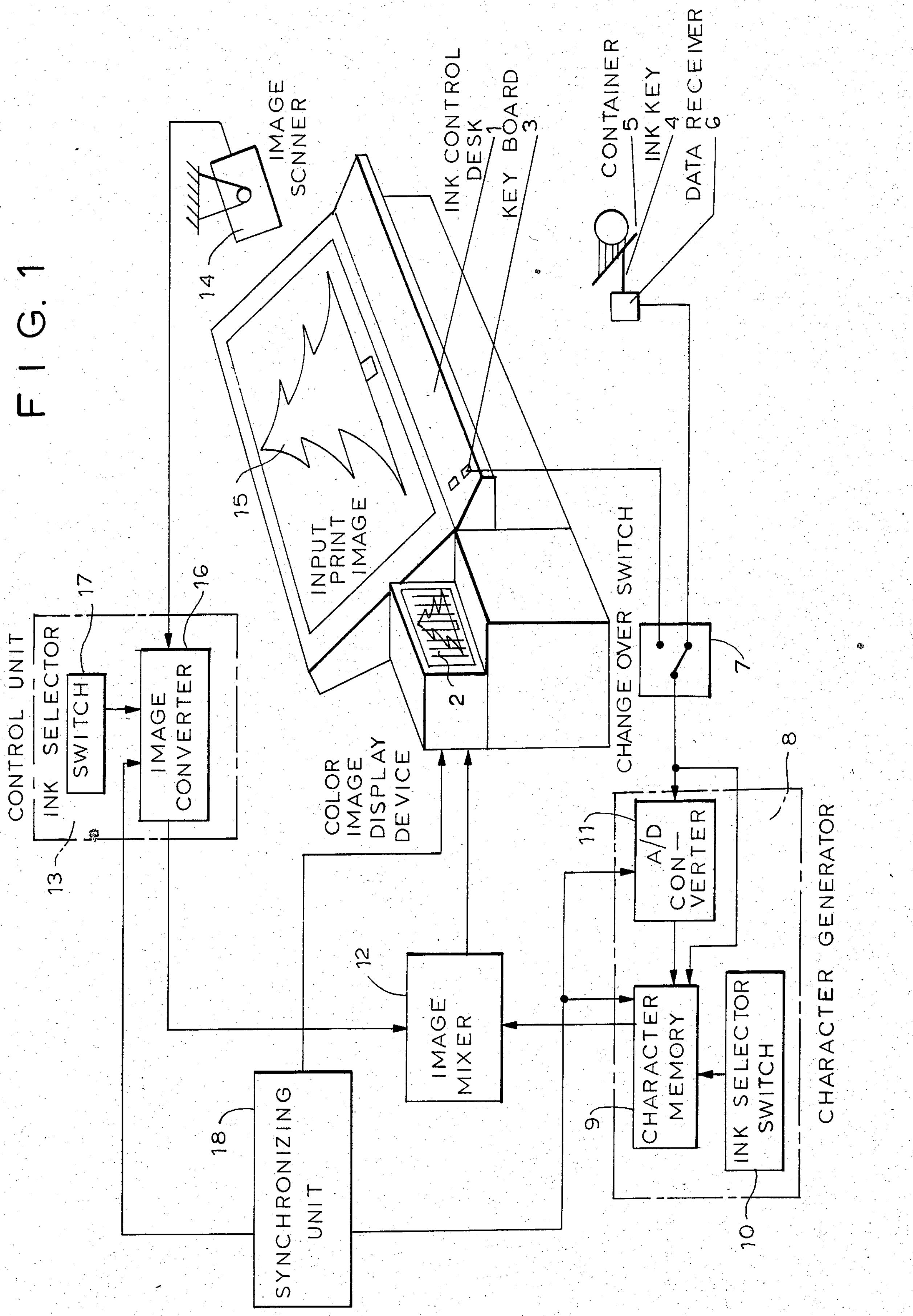
FIG. 1 illustrates an indicating apparatus.

Referring firstly to FIG. 1, there is shown an ink control desk 1 associated with an image screen device 2 for displaying values to be indicated like for example density values, setting and position values, tolerance values, nominal and actual values. The Nominal or desired values to be indicated are administered via a keyboard 3 arranged on the ink control desk 1 and the actual values are supplied by data (of which only one is shown in FIG. 1) receivers 6 arranged adjacent to the ink zone screws or ink keys 4 of ink containers 5. The keyboard 3 and the data receivers 6 are connected via a change-over switch 7 to a character generator 8.

The character generator 8 has a character memory 9 with associated ink selector switch 10 as well as an analog-to-digital converter 11. The output of the change-over switch 7 is connected to the analog-to-digital converter 11 as well as to the character memory 9. The image screen device 2 which is preferably designed as a color image display device 2 is connected to the character memory 9 of the character generator 8 via an image mixer 12. The second input of the image mixer 12 is connected to an image scanning device 14 via a control unit 13. The image scanning device 14 is developed as television camera or as a scanner for generating a teleimage. As can be seen from FIG. 1 in schematical illustration, the image scanning device 14 is directed to pick up an input print image 15 located on the ink control desk 1. It is also possible to use the image scanning device 14 for picking up the input print image from a diapositive or from a printing plate.

The control unit 13 includes an image converter 16 and an associated ink selector switch 17 which provides the ink selection of the input print image on the image display device. The input of the image converter 16 is associated to the image scanning device 14 and the output thereof is associated with the image mixer 12.

A common synchronizing unit 18 is associated to the image display device 2, character generator 8, and the control unit 13, as can be seen from FIG. 1.

Figure 2:
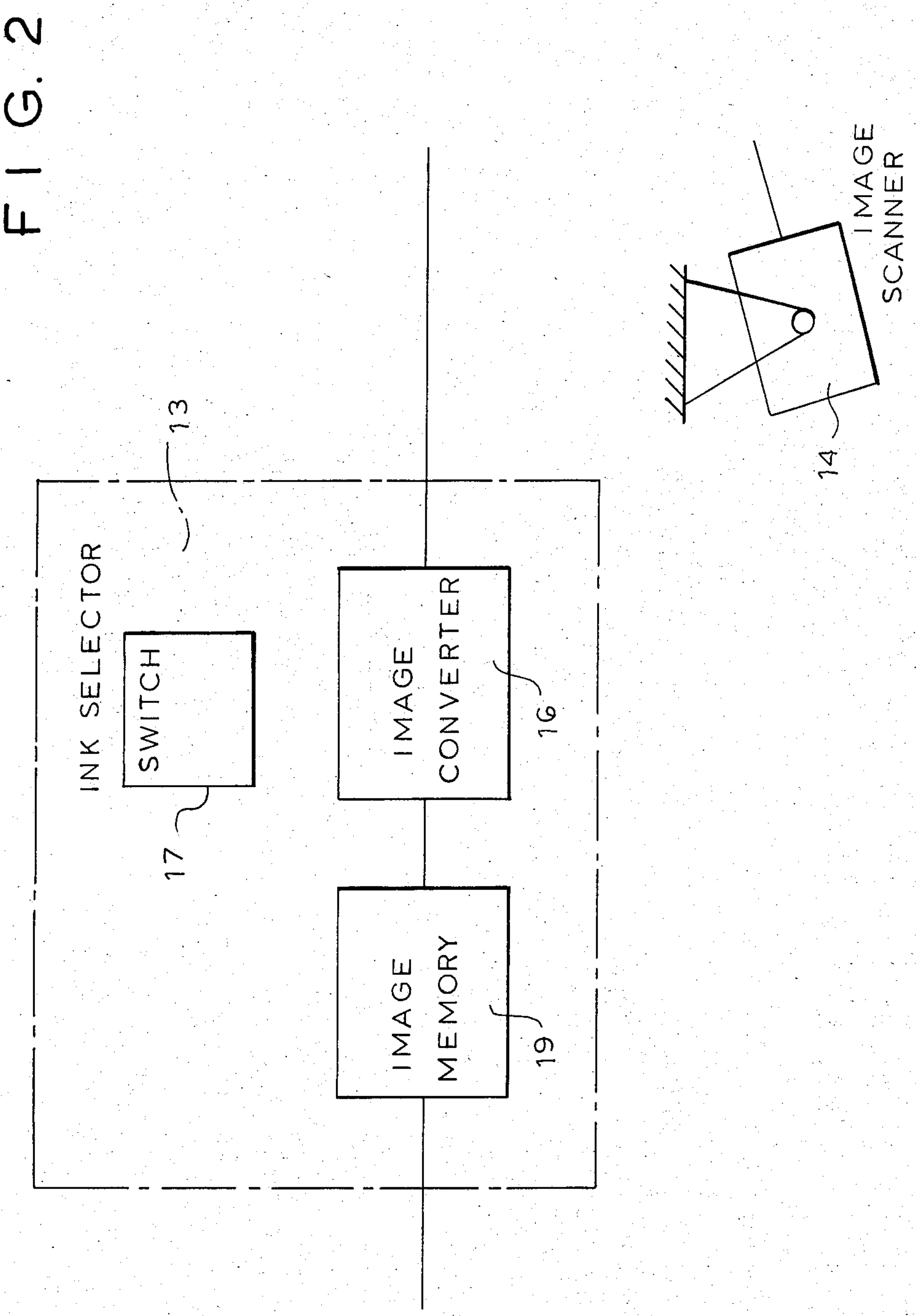
FIG. 2 illustrates a control device.

In FIG. 2, it can be seen that the control unit 13 includes in addition to the image converter 16 and the ink selector switch 17, an image memory 19 whose input is connected to the output of the image converter 16 and whose output is connected to the image mixer 12.

After having explained the individual parts of the indicating apparatus, the mode of operation will now be explained.

The nominal values administered by the keyboard 3 or the actual values delivered by the data receivers 6 are transmitted to the change-over switch 7 which allows a selection of nominal or actual values to be indicated. These values are prepared in the character generator 8 in a manner known per se and are transmitted via the image mixer 12 which is known per se to the image display device 2.

The character generator 8 is provided with an ink selector switch 10 which allows the selection of the ink tone of the values to be displayed. As already mentioned, the image scanning device 14 picks up the input printing image 15 which can be a proof sheet, a print sheet, a diapositive or a printing plate.

The signals which correspond to the input print image 15 are converted in the image converter 16 and transmitted to the image display device 2 via the image mixer 12. Consequently, in addition to the indicated values administered by the keyboard 3 or delivered by the data receivers 6, the image display device 2 displays the image to be printed so that an unambiguous association of the indicated values to the image to be printed is provided. The operator is therefore in a position to comprehend instantaneously the image to be printed as well as the superimposed indicated values.

As can be further seen from FIG. 1, the character generator 8, the image display device 2 and the image converter 16 all have inputs which are associated to the respective outputs of a synchronizing unit 18 so as to guarantee a uniform picture scan.

Through the use of the image memory 19 which can be associated to the image converter 16, it is possible to transmit the input print image onto the screen without necessitating an extended operation of the image scanning device 14.

It will be understood that each of the elements described above, or two or more together, may also find a useful application in other types of constructions differing from the types described above.

While the invention has been illustrated and described as embodied in an indicating apparatus for ink control units, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims.

What is claimed is:

1. An indicating device for a printing machine having ink keys, comprising: displaying means; means for scanning an input print image to be printed and producing signals corresponding to the scanned image; means for producing digital signals corresponding to desired or actual setting values for ink keys; means for mixing the signals corresponding to the scanned image and the digital signals; and means for simultaneously transmitting the mixed signals to the displaying means to display thereon the desired or actual setting values superimposed over the input print image to be printed.

2. A device as defined in claim 1, wherein the scanning means is a TV camera.

3. A device as defined in claim 1 wherein the means for producing the digital signals includes a character generator connected to the mixing means.

4. A device as defined in claim 1 wherein the scanning means is connected to the mixing means via a ink control unit.

5. A device as defined in claim 4, wherein the control unit includes an image converter.

6. A device as defined in claim 4, wherein the control unit includes an image converter and an image memory.

7. A device defined in claim 6, wherein the control unit includes an ink selection switch connected to the image converter.

* * * * *